Jan. 2, 1968 G. H. FREIER ET AL 3,361,428

RECORD CHANGER SPINDLE

Filed May 21, 1965 3 Sheets-Sheet 1

Inventors
Gerald H. Freier and
Robert J. Hammond
By Brown, Jackson,
Boettcher & Dienner Att'ys.

RECORD CHANGER SPINDLE

Filed May 21, 1965 3 Sheets-Sheet 2

Inventors
Gerald H. Freier and
Robert J. Hammond
By Brown, Jackson,
Boettcher & Dienner Att'ys.

RECORD CHANGER SPINDLE

Filed May 21, 1965 3 Sheets-Sheet 3

Inventors
Gerald H. Freier and
Robert J. Hammond
By Brown, Jackson,
Boettcher & Dienner Att'ys.

United States Patent Office 3,361,428
Patented Jan. 2, 1968

3,361,428
RECORD CHANGER SPINDLE
Gerald H. Freier, Benton Harbor, and Robert J. Hammond, Stevensville, Mich., assignors to V-M Corporation, Benton Harbor, Mich., a corporation of Michigan
Filed May 21, 1965, Ser. No. 457,755
14 Claims. (Cl. 274—10)

ABSTRACT OF THE DISCLOSURE

A record changer spindle having an expandable cap for retaining a record stack during changing operations, and an axially slidable collar with two sets of pivotable fingers, one set extending upwardly and the other downwardly. As the collar is axially moved, cams on the spindle body coact with the fingers to control their position. The upward fingers when pivoted outward support the stack and when retracted permit a record to fall. The downward fingers are simultaneously outwardly pivoted and stop the record for size sensing. Retracting at a controlled rate they control the record's descent.

The present invention relates to a center spindle for a phonograph record changer, and particularly to a center spindle of the self-supporting type having a plurality of record supporting fingers which support a stack of records on an upper storage portion of the spindle without the need for an overlying support arm or the like to stabilize the record stack.

It is known in the art to provide a record changer spindle of the self-supporting type having record feeding mechanism for supporting a stack of records on an upper storage portion of the spindle and dropping the records one at a time to a turntable for palying. It is also known to first release a record from the stack and then support the record in an intermediate position before dropping the same to the turntable, whereby a tone arm or other sensing member may be engaged against the peripheral edge of the record to sense the size thereof before the record is released to the turntable. The record changer spindle of the present invention comprises mechanism which performs the foregoing functons efficiently and in an improved manner and yet is extremely simple in its construction.

Conventional record changer spindles of the type mentioned above normally comprise record supporting means which simply release the bottom record in a stack in order to permit such record to fall freely to the turntable. However, the record changer spindle mechanism of the present invention will first drop the bottom record of the stack to an intermediate size-sensing position, and once the size of the record is sensed it is released to the turntable in such a manner that its fall is controlled at least for a portion of the distance between the intermediate position and the turntable. By controlling the fall of the record, the impact produced when the record lands on the turntable or on records already disposed on the turntable is greatly reduced so as to minimize the possibility of damage to the records. Moreover, in accordance with the present invention the fall of each record to the turntable is partially controlled by record feeding mechanism which is substantially less complex and less expensive than most conventional mechanisms which do not in any way control the fall of a record to the turntable.

Accordingly, it is an object of the present invention to provide a self-supporting record changer center spindle which is efficient and dependable in its record feeding operations and yet unusually simple in its construction and inexpensive to manufacture.

Another object of the invention is to provide a record changer spindle of the foregoing type which supports each record in turn in an intermediate size-sensing position before releasing the record to a turntable for playing.

A further object of the invention is to provide a record changer spindle as last above-mentioned which partially controls the fall of a record from the intermediate size-sensing position to the turntable.

An additional one of our objects is to provide an improved record changer spindle having a manual position whereby records may be manually lowered over the spindle to the turntable and removed therefrom without interference from the record feeding mechanism.

The foregoing and other objects and advantages of the invention will be apparent from the following description of a preferred embodiment thereof.

Now in order to acquaint those skilled in the art with the manner of constructing and utilizing our invention, we shall describe in conjunction with the accompanying drawings a preferred embodiment of the invention.

Figures 3, 4:
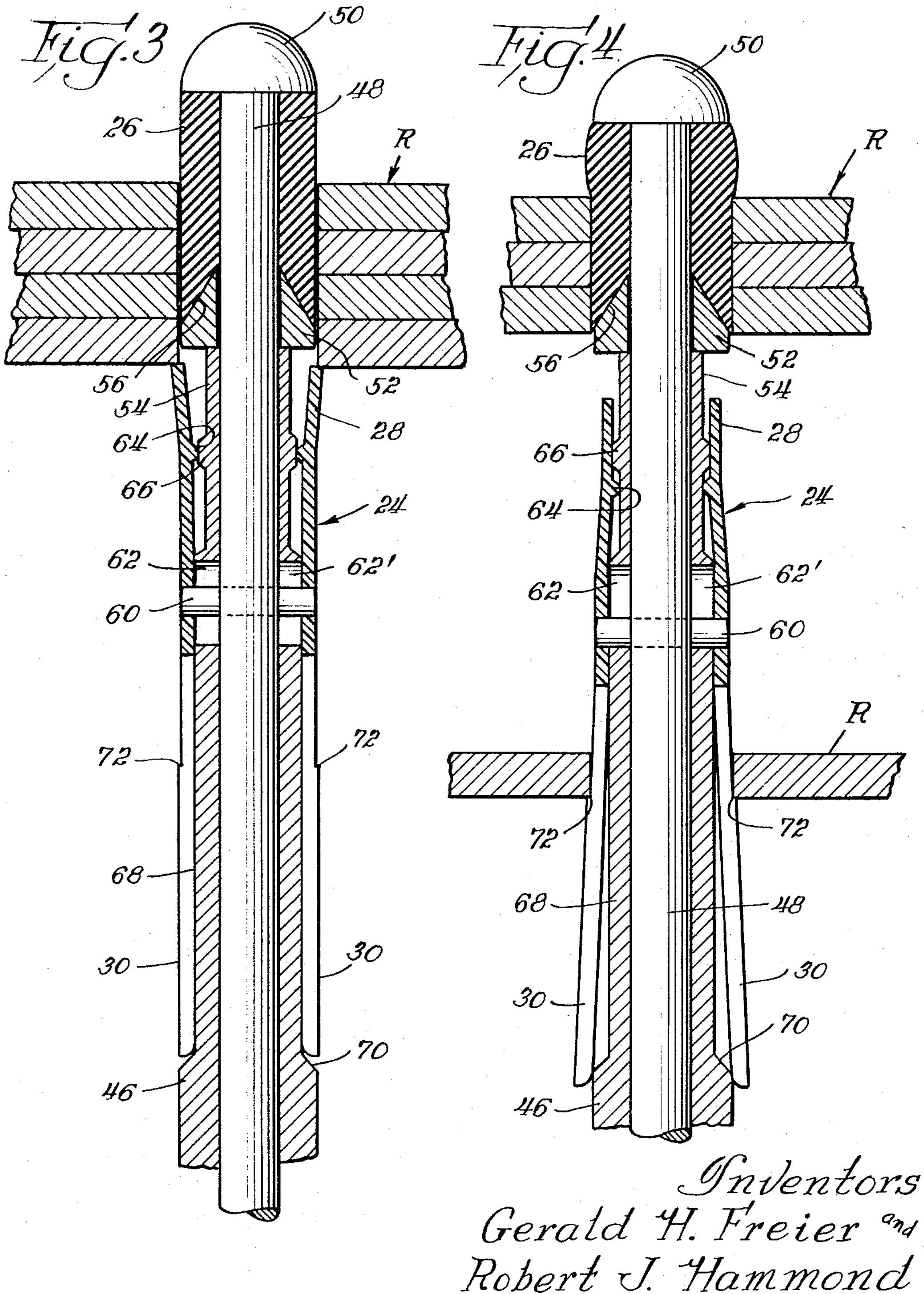
Figures 5, 6, 7:
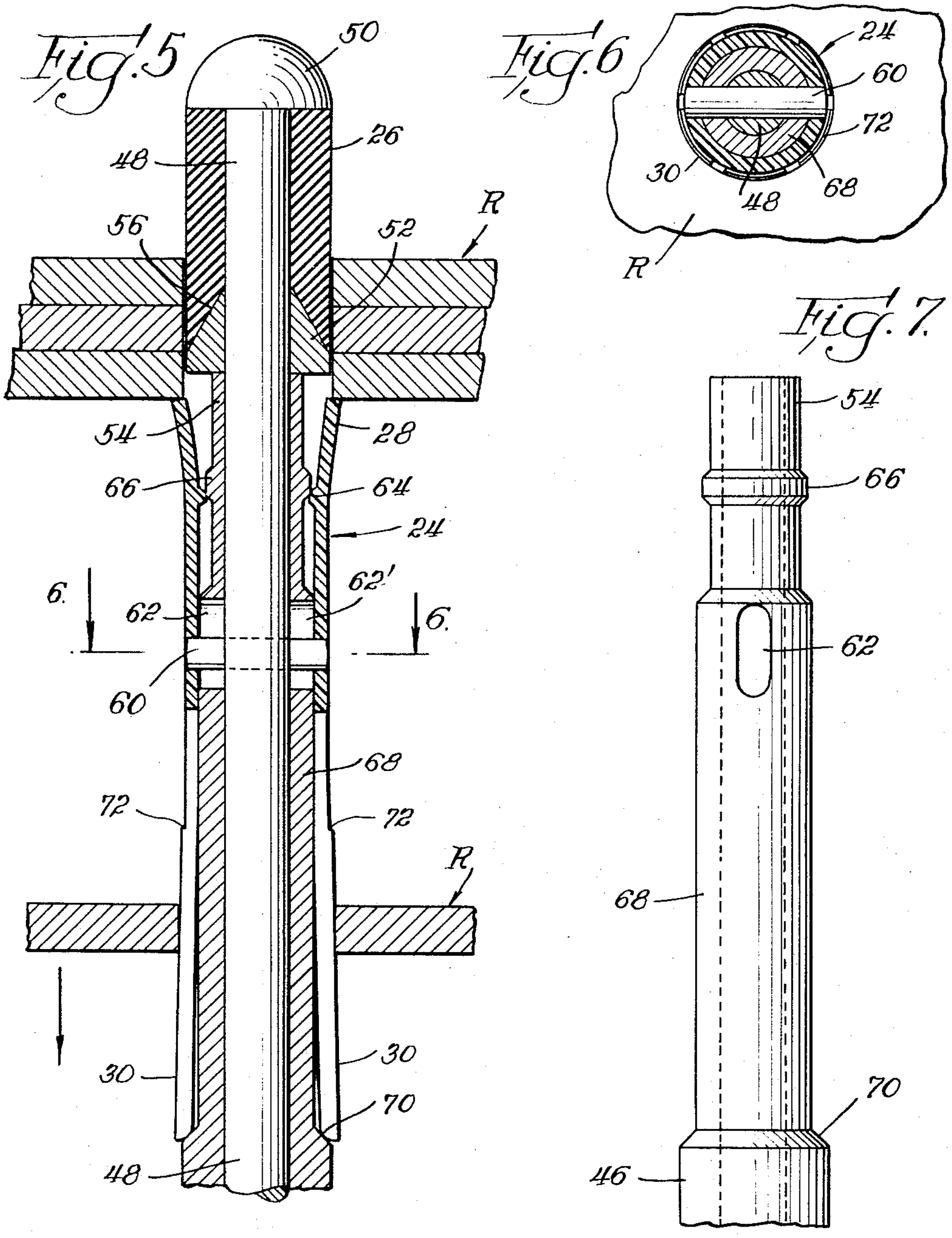
Figure 8:
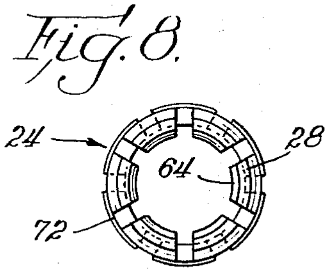

FIGURE 3 is a vertical sectional view showing the record changer spindle in its normal at rest position wherein primary record supporting means comprising a plurality of upper supporting fingers are operatively extended, secondary record supporting means comprising a flexible sleeve is retracted to a non-gripping position, and intermediate record supporting means comprising a plurality of lower supporting fingers are retracted to inoperative positions;

FIGURE 4 is a vertical sectional view showing the record changer spindle components in the positions to which they are actuated during a record change cycle wherein the upper supporting fingers are retracted to release the bottom record from the record stack on the upper storage portion of the spindle, the flexible sleeve is expanded to retain the remainder of the record stack, and the lower supporting fingers are extended to operative positions to support the released record in an intermediate size-sensing position;

FIGURE 5 is a vertical sectional view which illustrates the controlled fall of a record from the intermediate size-sensing position to the turntable when the record feeding components are returned from the positions of FIGURE 4 to the positions of FIGURE 3;

FIGURE 6 is a horizontal sectional view taken approximately along the line 6—6 of FIGURE 5;

FIGURE 7 is a fragmentary elevational view of the upper end of the spindle body which comprises one component of the record changer spindle of the present invention; and FIGURE 8 is a detail top plan view of a unitary spindle collar which in accordance with a preferred embodiment of the present invention comprises both a plurality of upper record supporting fingers and a plurality of lower record supporting fingers.

Figures 1, 2:
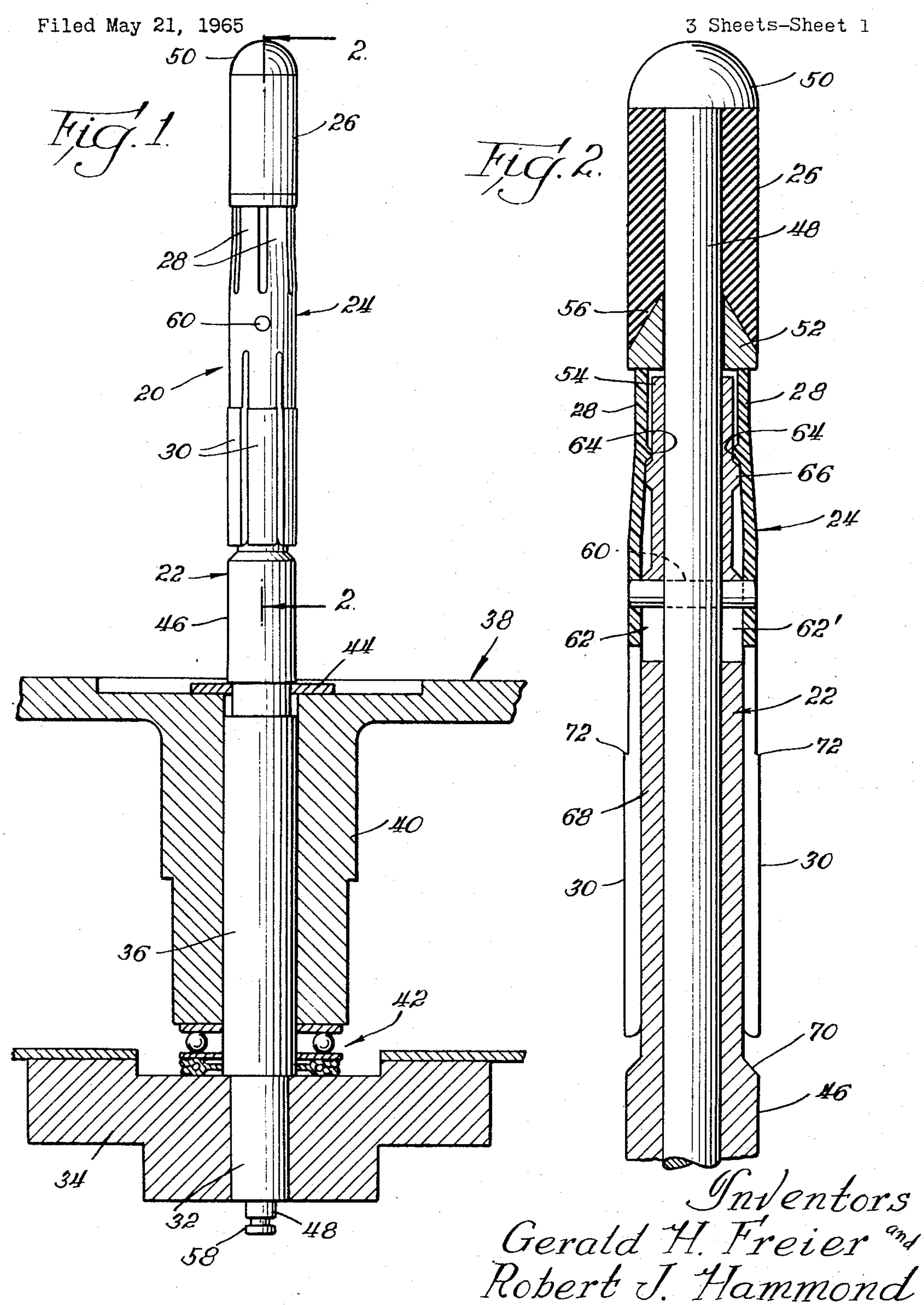
FIGURE 1 is an elevational view, partly in section and partly broken away, illustrating a record changer spindle constructed in accordance with the present invention and showing the same in combination with a turntable and related structure.
FIGURE 2 is an enlarged fragmentary vertical sectional view taken approximately along the line 2—2 of FIGURE 1 illustrating the record changer spindle in its manual position wherein records may be placed over the spindle and manually lowered to the turntable without interference from the record feeding mechanism embodied in the spindle.

Referring now to the drawings, FIGURE 1 shows a record changer center spindle 20 of the self-supporting type comprising a spindle body 22, a record supporting collar 24 which is mounted over the spindle body and is vertically slidable thereon, and secondary record supporting means comprising an expandable rubber sleeve 26 which is disposed above the upper end of the spindle body. The collar 24, which is made of nylon in the embodiment being described, comprises primary record supporting means in the form of six upwardly extending supporting fingers 28 which normally support a stack of records R on an upper storage portion of the spindle, and further comprises six lower downwardly extending supporting fingers 30 which serve to support a record in an intermediate size-sensing position.

The lower end of the spindle body 22 comprises a section 32 which is seated in a support plate 34 so as to mount the spindle in an upright manner, and an enlarged diameter section 36 immediately above the section 32 serves as a bearing post for mounting a turntable 38. The turntable 38 is provided with an integral sleeve 40 which fits over the spindle body section 36 so as to be rotatable thereon, and a ball bearing 42 is mounted between the lower end of the turntable sleeve 40 and the support plate 34 to support the weight of the turntable. A washer 44 is secured to the spindle body 22 immediately above the turntable sleeve 40 to axially retain the turntable 38 on the spindle body while permitting it to rotate thereon. The spindle body 22 includes a spindle section 46 immediately above the top of the turntable 38. The spindle section 46 serves to center records which are disposed on the turntable and is of a diameter slightly less than the centerhole diameter of the records.

In the particular embodiment being described herein the length or height of the spindle body section 46 is sufficient to accommodate a total of six records on the turntable 38. Similarly, the extreme upper end of the spindle 20 which comprises the rubber sleeve 26, sometimes referred to herein as the upper storage portion of the spindle, is also of a length sufficient to accommodate a stack of six records supported on the tops of the upper supporting fingers 28. It will of course be understood that the lengths of the upper storage portion 26 and the spindle section 46 may be varied to accommodate any desired number of records on the spindle 20.

A center rod 48 is disposed inside the spindle body 22 and projects above the upper end thereof as shown in FIGURE 2. A cap 50 is mounted on the center rod 48 at the extreme upper end thereof, and the rubber sleeve 26 is mounted on the center rod immediately beneath the cap 50. A spreader ring 52 is disposed on the center rod 48 between the lower end of the rubber sleeve 26 and the extreme upper end 54 of the spindle body 22, and in the position shown in FIGURE 2 the spreader ring rests on the tops of the upper record supporting fingers 28. The spreader ring 52 has a generally frusto-conical upper surface 56 which serves to expand the rubber sleeve 26 radially outwardly when the center rod 48 is moved downwardly, as will be described more fully later herein. The center rod 48 extends downwardly through the entire length of the spindle body 22 and an extreme lower end portion 58 of the center rod projects downwardly beneath the mounting plate 34 as shown in FIGURE 1 for cooperation with actuating mechanism (not shown) for vertically reciprocating the center rod during a record change cycle.

Still referring to FIGURE 2, the center rod 48 carries a cross pin 60 which extends through the center rod and projects outwardly through oppositely disposed vertical slots 62 and 62′ formed in opposite sides of the spindle body 22. The outer ends of the cross pin 60 extend into respective apertures formed in opposite sides of the collar 24, whereby when the center rod 48 is moved vertically within the spindle body 22, the collar 24 will be moved therewith on the outside of the spindle body. The slots 62 and 62′ are of sufficient length to permit the desired vertical stroke of the center rod 48.

Each of the six upper supporting fingers 28 is provided with an internal projecting rib 64 which cooperates with an annular shoulder 66 formed on the outside of the spindle body 22. In the positions of the components as viewed in FIGURE 2, the collar 24 is in its uppermost position on the spindle body 22, and in such position the internal ribs 64 on the upper fingers 28 are disposed immediately above the annular shoulder 66, whereby the ribs lie against the reduced diameter upper spindle body section 54. That is, the upper supporting fingers 28 are flexible and are biased inwardly, and when the ribs 64 are above the shoulder 66 the supporting fingers 28 spring inwardly to radially retracted positions wherein they will not interfere with records which are mounted over the spindle 20. Furthermore, with the center rod 48 and cap 50 in their uppermost positions of FIGURE 2, and with the spreader ring 52 resting on the tops of the upper supporting fingers 28, the rubber sleeve 26 is permitted to assume substantially its full length in which position the diameter thereof is slightly less than the centerhole diameter of the records. Accordingly, in the latter position of the sleeve 26 it will permit records to be freely mounted over the upper end of the spindle or removed therefrom without interference.

The spindle body 22 is further provided with a body section 68 which underlies the lower supporting fingers 30 and is of a reduced diameter in the sense that when the fingers 30 lie against the body section 68 the fingers will not interfere with movement of a record along the spindle. That is, the lower supporting fingers 30 are flexible and are biased inwardly, and when the fingers lie against the spindle body section 68 they are radially retracted sufficiently to permit a record on the spindle to pass thereover without interference. However, an annular shoulder 70 is formed at the lower end of the spindle section 68 where the spindle body flares out to the larger diameter spindle section 46, and the shoulder 70 cooperates with the lower ends of the fingers 30 to expand the latter radially outwardly during a record change cycle. In the uppermost position of the collar 24 as shown in FIGURE 2, and also in the normal intermediate position of FIGURE 3, the lower ends of the fingers 30 are disposed above the shoulder 70 and thus are radially retracted. However, when the collar 24 is moved to its lowermost position as shown in FIGURE 4, the fingers 30 ride out on the shoulder 70 and are radially expanded so as to prevent the passage of a record thereover. As will be described more fully hereinafter, each of the lower fingers 30 is provided with a slight shelf portion 72, and as shown in FIGURE 4 a record released from above will be retained on the shelf portions 72 if the fingers 30 are in their radially expanded positions.

The operation of the foregoing record changer center spindle 20 will now be described. FIGURE 3 shows the record feeding components in their at rest positions which they normally occupy except during a record change cycle. The center rod 48 is in an intermediate position, and by means of the cross pin 60 it locates the collar 24 with the internal ribs 64 on the upper supporting fingers 28 disposed on the outside of the annular shoulder 66. Thus, the upper record supporting fingers 28 are held in radially expanded positions wherein the upper ends thereof are operative to support a stack of records R on the upper storage portion of the spindle, although it should be understood that due to the flexibility of the fingers they will deflect inwardly to permit removal of records from the spindle. The spreader ring 52 rests on the upper end 54 of the spindle body 22 and in such position it permits the secondary record supporting means or rubber sleeve 26 to assume substantially its full length whereby the diameter of the sleeve is less than the centerhole diameter of the records R and the sleeve does not grip any of the records adjacent thereto. Accordingly, a stack of records R to be played may be placed over the upper end of the spindle 20 and supported on the upper ends of the primary record supporting fingers 28. In the normal positions of the components as shown in FIGURE 3, the lower ends of the lower supporting fingers 30 are disposed about the spindle body shoulder 70 and therefore the lower fingers are in radially retracted or inoperative positions.

During a record change cycle when it is desired to release a record to the turntable for playing, the center rod 48 is moved to its lowermost position as shown in FIGURE 4 wherein the cross pin 60 is disposed at the lower ends of the slots 62 and 62' in the spindle body. As the center rod 48 is moved downwardly, the cap 50 on the upper end of the center rod axially compresses the rubber sleeve 26 by forcing the same downwardly against the frusto-conical spreader ring 52 which in turn is supported on the upper end 54 of the spindle body. The rubber sleeve 26 is thereby forced downwardly on the spreader ring 52 and is radially expanded at its lower end against the centerhole edge of the next-to-lowermost record in the stack of records R supported on the upper supporting fingers 28. Consequently, the entire record stack except for the bottom record is supported on the upper end of the spindle by the sleeve 26. Moreover, as the center rod 48 moves downwardly it carries with it the collar member 24 so as to lower the upper supporting fingers 28 and the lower supporting fingers 30, all of which are integral with the unitary collar member 24.

As the upper supporting fingers 28 are moved downwardly to the position of FIGURE 4, the internal ribs 64 thereon move beneath the annular shoulder 66 thereby permitting the fingers to move in closer to the spindle body 22 to radially retracted positions. When the upper supporting fingers 28 retract in the same manner described they release the bottom record from the stack. However, the lower supporting fingers 30 are simultaneously moved downwardly to the position of FIGURE 4 and the lower ends thereof ride out on the annular shoulder 70 thereby causing the fingers 30 to be deflected radially outwardly to operative record supporting positions. Accordingly, as the record released by the upper fingers 28 falls downwardly on the spindle, it is stopped in an intermediate position on the ledges 72 formed on the lower supporting fingers 30. The purpose of supporting the next record to be played in an intermediate position is to permit the size of the record to be sensed before releasing the same to the turntable, and the size-sensing may be performed in a conventional manner by swinging the tone arm or other sensing member in against the peripheral edge of the record.

After the size-sensing operation has been completed, the center rod 48 is moved upwardly again to the original position of FIGURE 3 causing return of the upper supporting fingers 28 to the radially extended positions of FIGURE 3 and causing return of the lower supporting fingers 30 to the radially retracted positions of FIGURE 3. In addition, the upward movement of the cap 50 permits the rubber sleeve 26 to elongate once again substantially to its full length whereby it retracts radially to a non-gripping position. It will thus be understood that when the center rod 48 is moved upwardly to the position of FIGURE 3, the remaining record stack is released by the secondary supporting means or sleeve 26 and is again supported on the upper ends of the primary record supporting fingers 28. In addition, the retraction of the lower supporting fingers 30 causes the record previously supported on the ledge portions 72 to be released to the turntable for playing.

One of the important features of the record changer spindle of the present invention relates to the operation of the lower supporting fingers 30 in releasing a record supported thereon and permitting the same to fall to the turntable. FIGURE 5 illustrates the positions of the components as the center rod 48 is moving upwardly from the position of FIGURE 4 to the position of FIGURE 3, and it will be seen that the lower ends of the fingers 30 ride up along the incline of the annular shoulder 70 so as to gradually retract radially as they move upwardly. As the fingers 30 being to retract radially they permit the record thereon to pass downwardly over the ledges 72, but because the radially outer portions of the fingers still define a conical surface, they continue to exert control over the fall of the record. Consequently, the record disposed on the lower fingers 30 will fall downwardly toward the turntable, but its rate of descent is controlled by the fingers 30 and as the lower ends of the latter move radially inwardly the record is permitted to descend.

When the record passes beyond the lower ends of the fingers 30, it will then fall freely on the spindle section 46 to the turntable or to the stack of records already disposed on the turntable. However, the maximum distance the record will fall freely will be the vertical distance between the lower ends of the supporting fingers 30 and the upper surface of the turntable, as in the case where there are no records previously positioned on the turntable. Thus, the lower record supporting fingers 30 appreciably shorten the distance through which a record will fall freely when released to the turntable, and at the same time the structure of the fingers is extremely simple, and the vertical stroke of the center actuator rod 48 is no greater than is required with record feeding mechanisms which provide no control over the fall of a record to the turntable.

The record changer spindle of the present invention has the further advantage of providing a manual position which is illustrated in FIGURE 2. In order to condition the spindle for manual placement of records on the turntable, the center rod 48 is moved to its uppermost position wherein the cross pin 60 is disposed at the upper ends of the slots 62 and 62' in the spindle body. Such upward movement of the center rod 48 will move the collar 24 to its uppermost position of FIGURE 2 wherein the ribs 64 formed at the insides of the supporting fingers 28 will be disposed above the annular shoulder 66 on the spindle body. Thus, the upper supporting fingers 28 will spring inwardly to radially retracted positions wherein they will not interfere with the passage of a record over the spindle. Similarly, the lower ends of the supporting fingers 30 will be well above the annular shoulder 70 on the spindle body so that the latter fingers will also be disposed in radially retracted positions wherein they will not interfere with passage of a record over the spindle. Moreover, the cap 50 will be in its uppermost position and the spreader ring 52 will rest on the upper ends of the supporting fingers 28 with the result that the rubber sleeve 26 will be in its elongated radially retracted position wherein it will permit records to be freely passed thereover. Consequently, when the center rod 48 is placed in the uppermost position of FIGURE 2, and permitted to remain in such position, the spindle 20 will be conditioned to permit manual placement of a record over the spindle and onto the turntable without interference from any of the record supporting components of the spindle.

It will be seen that the spindle mechanism of the present invention is designed to support a stack of records on the upper storage portion of the spindle, release one record at a time from the bottom of the stack, temporarily support the released record in an intermediate size-sensing position, and then drop the record from the intermediate position to the turntable while controlling the fall of the record at least during a portion of its travel. In addition, the spindle mechanism may be conditioned for manual play by raising the center rod to its uppermost position and thereby positioning the several record supporting components so that they will not interfere with manual placement of a record over the spindle and onto the turntable. It will further be seen that the spindle mechanism of the present invention is extremely simplified in its construction and that the unitary collar 24 having the integral upper supporting fingers 28 and the integral lower supporting fingers 30 is slidable upwardly and downwardly on the outside of the spindle body and cooperates with the annular shoulders 66 and 70 formed on the spindle body to control the radial expansion and contraction of the respective groups of upper and lower supporting fingers at the proper times in the operating cycle.

While we have illustrated our invention in a preferred form, we do not intend to be limited to that form, except insofar as the appended claims are so limited, since modifications coming within the scope of our invention will be readily suggested to others with our disclosure before them.

We claim:

1. In a record changer center spindle of the type adapted to support a record on the upper portion thereof preparatory to releasing a record for movement to a turntable for playing, the improvement comprising, in combination, a plurality of circumferentially spaced downwardly extending record supporting fingers disposed about the center spindle below the upper portion thereof, said fingers being generally pivotally movable approximately about their upper ends between radially retracted positions wherein they will permit passage of a record thereover and radially extended positions wherein they will support a record on the spindle in vertically spaced relation to a turntable, and means operative for effecting radially outward and inward movement of said downwardly extending fingers, said means being adapted to move the fingers between said radially extended positions and radially retracted positions at such a controlled rate as to cause a record supported on said fingers to slide down the fingers in a controlled manner as the fingers are moved radially inward and be released to the turntable for playing.

2. In a record changer center spindle of the type adapted to support a record on the upper portion thereof preparatory to releasing a record for movement to a turntable for playing, the improvement comprising, in combination, a plurality of circumferentially spaced downwardly biased record supporting fingers disposed above the center spindle below the upper portion thereof, said fingers being flexible and being supported from their upper ends so as to be generally pivotally movable approximately about their upper ends in cantilever fashion between radially retracted positions wherein they will permit passage of a record thereover and radially extended positions wherein they will support a record on the spindle in vertically spaced relation to a turntable, and means acting upon said fingers adjacent their lower ends for deflecting said fingers to their radially extended positions to support a record, said means being further operative to move the fingers between said radially extended positions and said radially retracted positions at such a controlled rate as to cause a record supported thereon to slide down the fingers in a controlled manner and be released to the turntable for playing.

3. In a record changer center spindle of the type adapted to support a record on the upper portion thereof preparatory to releasing a record for movement to a turntable for playing, the improvement comprising, in combination, a spindle body member, a collar encompassing said spindle body and axially slidable thereon below the upper portion of the center spindle, a plurality of circumferentially spaced record supporting fingers supported from said collar and extending downwardly therefrom, said fingers being generally pivotally movable approximately about their upper ends between radially retracted positions wherein they will permit passage of a record thereover and radially extended positions wherein they will support a record on the spindle in vertically spaced relation to a turntable, and means operative for effecting radially outward and inward movement of said downwardly extending fingers, said means being adapted to move the fingers between said radially extended positions and radially retracted positions at such a controlled rate as to cause a record supported on said fingers to slide down the fingers in a controlled manner upon upward movement of said collar and be released to the turntable for playing.

4. In a record changer center spindle of the type adapted to support a record on the upper portion thereof preparatory to releasing a record for movement to a turntable for playing, the improvement comprising, in combination, a spindle body member, a collar encompassing said spindle body and axially slidable thereon below the upper portion of the center spindle, a plurality of circumferentially spaced record supporting fingers supported from said collar and extending downwardly therefrom, said fingers being generally pivotally movable approximately about their upper ends between radially retracted positions wherein they will permit passage of a record thereover and radially extended positions wherein they will support a record on the spindle in vertically spaced relation to a turntable, means formed on said spindle body for engagement with said fingers adjacent the lower ends thereof to effect said radially extended and retracted positions of said fingers in accordance with the axial position of said collar on said spindle body, upward movement of said collar relative to said means serving to effect said radially inward movement of said downwardly extending fingers, and means for moving said collar and said fingers upwardly at such a controlled rate as to cause a record supported thereon to slide down the fingers in a controlled manner and be released to the turntable for playing.

5. In a record changer center spindle of the type adapted to support a record on the upper portion thereof preparatory to releasing a record for movement to a turntable for playing, the improvement comprising, in combination, a spindle body member, a collar encompassing said spindle body and axially slidable thereon below the upper portion of the center spindle, a plurality of circumferentially spaced record supporting fingers which are integral with said collar and extend downwardly therefrom, said fingers being flexible and being generally pivotally movable approximately about their upper ends in cantilever fashion between radially retracted positions wherein they will permit passage of a record thereover and radially extended positions wherein they will support a record on the spindle in vertically spaced relation to a turntable, means formed on said spindle body for engagement with said fingers adjacent the lower ends thereof for deflecting said fingers and effecting radially extended and retracted positions of said fingers in accordance with the axial position of said collar on said spindle body, upward movement of said collar relative to said means serving to effect radially inward movement of said downwardly extending fingers, and means for moving said collar and said fingers upwardly at such a controlled rate as to cause a record supported thereon to slide down the fingers in a controlled manner and be released to the turntable for playing.

6. In a record changer center spindle of the type having secondary record supporting means for retaining all but the lowermost record in a stack on an upper storage portion of the spindle when the lowermost record is released to a turntable for playing, the improvement comprising, in combination, primary record supporting means disposed below the upper portion of the spindle and normally in an extended position to support a stack of records on the upper storage portion of the spindle, said primary record supporting means being movable from said normally extended position to a retracted position during a record change cycle to release the bottom record in the stack, means operative for effecting extended and retracted movement of said primary record supporting means, a plurality of circumferentially spaced downwardly extending record supporting fingers disposed beneath said primary record supporting means, said fingers being generally pivotally movable approximately about their upper ends between radially retracted positions wherein they will permit passage of a record thereover and radially extended positions wherein they will stop a record which has been released down the spindle by said primary record supporting means and support such record in an intermediate size-sensing position, and means operative for effecting radially outward and inward movement of said downwardly extending fingers, said means being adapted to be operative after a size-sensing operation for effecting radially inward movement of said downwardly extending fingers at such a controlled rate as to cause the record previously supported in the size-sensing position to slide down the fingers in a controlled manner and be released to a turntable for playing.

7. In a record changer center spindle of the type having secondary record supporting means for retaining all but the lowermost record in a stack on an upper storage portion of the spindle when the lowermost record is released to a turntable for playing, the improvement comprising, in combination, a plurality of upwardly extending primary record supporting fingers disposed below the upper portion of the spindle and normally disposed in operative radially extended positions to support a stack of records on the upper ends thereof on the upper storage portion of the spindle, said primary record supporting fingers being movable to radially retracted positions during a record change cycle to release the bottom record in the stack, means operative for effecting extended and retracted movement of said primary record supporting fingers, a plurality of circumferentially spaced downwardly extending record supporting fingers disposed beneath said primary supporting fingers, said lower downwardly extending fingers being generally pivotally movable approximately about their upper ends between radially retracted positions wherein they will permit passage of a record thereover and radially extended positions wherein they will stop a record which has been released down the spindle by said primary record supporting fingers and support such record in an intermediate size-sensing position, and means operative for effecting radially outward and inward movement of said downwardly extending fingers, said means being adapted to be operative after a size-sensing operation for effecting radially inward movement of said downwardly extending fingers at such a controlled rate as to cause the record previously supported in the size-sensing position to slide down the lower fingers in a controlled manner and be released to a turntable for playing.

8. In a record changer center spindle of the type having secondary record supporting means for retaining all but the lowermost record in a stack on an upper storage portion of the spindle when the lowermost record is released to a turntable for playing, the improvement comprising, in combination, a plurality of upwardly extending primary record supporting fingers disposed below the upper portion of the spindle and normally disposed in operative radially extended positions to support a stack of records on the upper ends thereof on the upper storage portion of the spindle, said primary record supporting fingers being movable to radially retracted positions during a record change cycle to release the bottom record in the stack, means operative for effecting extended and retracted movement of said primary record supporting fingers, a plurality of circumferentially spaced downwardly extending inwardly biased record supporting fingers disposed beneath said primary supporting fingers, said lower downwardly extending fingers being flexible and being supported from their upper ends so as to be generally pivotally movable approximately about their upper ends in cantilever fashion between radially retracted positions wherein they will permit passage of a record thereover and radially extended positions wherein they will stop a record which has been released down the spindle by said primary record supporting fingers and support such record in an intermediate size-sensing position, and means acting upon said downwardly extending fingers adjacent their lower ends and adapted to deflect said fingers to their radially extended positions to support a record in said size-sensing position, said means being further operative after a size-sensing operation to move the fingers between said radially extended positions and said radially retracted positions at such a controlled rate as to cause the record previously supported thereon to slide down said lower fingers in a controlled manner and be released to a turntable for playing.

9. In a record changer center spindle of the type having secondary record supporting means for retaining all but the lowermost record in a stack on an upper storage portion of the spindle when the lowermost record is released to a turntable for playing, the improvement comprising, in combination, a spindle body member, a collar encompassing said spindle body and axially slidable thereon below the upper storage portion of the spindle, a first group of record supporting fingers supported from said collar and extending upwardly therefrom, said first group of fingers normally being disposed in operative radially extended positions to support a stack of records on the upper ends thereof on the upper storage portion of the spindle and being generally pivotally movable approximately about their lower ends to radially retracted positions during a record change cycle to release the bottom record in the stack, a second group of circumferentially spaced record supporting fingers supported from said collar and extending downwardly therefrom below said first group of fingers, said second group of fingers being generally pivotally movable approximately about their upper ends between radially retracted positions wherein they will permit passage of a record thereover and radially extended positions wherein they will stop a record which has been released down the spindle by said first group of record supporting fingers and support such record in an intermediate size-sensing position, means for moving the collar upwardly and downwardly, first means responsive to movement of the collar operative to effect extended and retracted movement of said first group of record supporting fingers, second means responsive to movement of the collar operative to effect extended and retracted movement of said second group of fingers, said means for moving the collar adapted to be operative after a size-sensing operation for moving the collar at a controlled rate and thereby effecting radially inward movement of said second group of downwardly extending fingers at such a controlled rate as to cause a record supported thereon in said size sensing position to slide down said second group of fingers in a controlled manner and be released to a turntable for playing.

10. In a record changer center spindle of the type having secondary record supporting means for retaining all but the lowermost record in a stack on an upper storage portion of the spindle when the lowermost record is released to a turntable for playing, the improvement comprising, in combination, a spindle body member, a collar encompassing said spindle body and axially slidable thereon below the upper storage portion of the spindle, a first group of record supporting fingers which are integral with said collar and extend upwardly therefrom, said first group of fingers normally being disposed in operative radially extended positions to support a stack of records on the upper ends thereof on the upper storage portion of the spindle, and said first group of fingers being flexible so as to be generally pivotally movable approximately about their lower ends in cantilever fashion to radially retracted positions during a record change cycle to release the bottom record in the stack, a second group of circumferentially spaced record supporting fingers which are integral with said collar and extend downwardly therefrom below said first group of fingers, said second group of fingers being flexible so as to be generally pivotally movable approximately about their upper ends in cantilever fashion between radially retracted positions wherein they will permit passage of a record thereover and radially extended positions wherein they will stop a record which has been released down the spindle by said first group of record supporting fingers and support such record in an intermediate size-sensing position, means for moving the collar upwardly and downwardly, first means responsive to movement of the collar operative to effect extended and retracted movement of said first group of record supporting fingers, second means responsive to movement of the collar operative to effect extended and retracted movement of said second group of fingers, said means for moving the collar adapted to be operative after a size-sensing operation for moving the collar at a controlled rate and thereby effecting radially inward movement of said second group of downwardly extending fingers at such a controlled rate as to cause a record supported thereon in said size-sensing position to slide down said second group of fingers in a controlled manner and be released to a turntable for playing.

11. The invention of claim 10 wherein said first means comprises shoulder means formed on said spindle body adjacent said first group of upwardly extending fingers for engagement therewith and said second means comprises shoulder means formed on said spindle body adjacent said second group of downwardly extending fingers for engagement therewith whereby as said collar is moved axially on said spindle body said first and second shoulder means cooperate with said first and second groups of fingers to control the radial position thereof.

12. In a record changer center spindle of the type having secondary record supporting means for retaining all but the lowermost record in a stack on an upper storage portion of the spindle when the lowermost record is released to a turntable for playing, the improvement comprising, in combination, a spindle body member, a collar encompassing said spindle body and vertically slidable thereon, a first group of record supporting fingers which are integral with said ocllar and extend upwardly therefrom, said first group of fingers normally being disposed in operative radially extended positions to support a stack of records on the upper ends thereof on an upper storage portion of the spindle, and said first group of fingers being flexible so as to be generally pivotally movable approximately about their lower ends in cantilever fashion to radially retracted positions during a record change cycle to release the bottom record in the stack, a second group of circumferentially spaced record supporting fingers which are integral with said collar and extend downwardly therefrom, said second group of fingers being flexible so as to be generally pivotally movable approximately about their upper ends in cantilever fashion between radially retracted positions wherein they will permit passage of a record thereover and radially extended positions wherein they will stop a record which has been released down the spindle by said first group of record supporting fingers and support such record in an intermediate size-sensing position, first shoulder means formed on said spindle body adjacent said first group of upwardly extending fingers for engagement therewith and second shoulder means formed on said spindle body adjacent said second group of downwardly extending fingers for engagement therewith whereby as said collar is moved vertically on said spindle body said first and second shoulder means cooperate with said first and second groups of fingers to control the radial position thereof, and a center rod vertically movable within said spindle body and connected with said collar for moving the collar vertically on the outside of said spindle body, said center rod being movable between a first vertical position wherein said first group of fingers is expanded and said second group of fingers is retracted and a second vertical position wherein said first group of fingers is retracted and said second group of fingers is expanded.

13. The invention of claim 12 wherein internal ribs are formed on each of said first group of supporting fingers and said ribs are located so as to be disposed on the outside of said first shoulder means ot expand said first group of fingers when said center rod is in said first vertical position, and wherein said second shoulder means is located on said spindle body for engagement with the lower ends of said second group of fingers when said center rod is moved to said second vertical position.

14. The invention of claim 13 wherein said center rod is movable to a third vertical position disposed above said first vertical position in order to dispose said first group of fingers with said internal ribs located above said first shoulder means whereby said first and second groups of fingers will both be disposed in radially retracted positions so as to provide for manual placement of records over the spindle and onto a turntable.

References Cited

UNITED STATES PATENTS

| | | | |
|---|---|---|---|
| 3,023,008 | 2/1962 | Ansar | 274—10 |
| 3,265,393 | 8/1966 | Frier | 274—10 |

ROBERT B. HULL, *Primary Examiner.*

LEONARD FORMAN, *Examiner.*

J. M. FREED, *Assistant Examiner.*

UNITED STATES PATENT OFFICE

CERTIFICATE OF CORRECTION

Patent No. 3,361,428 January 2, 1968

Gerald H. Freier et al.

It is hereby certified that error appears in the above numbered patent requiring correction and that the said Letters Patent should read as corrected below.

Column 7, line 40, for "wardly biased record supporting fingers disposed above" read -- wardly extending inwardly biased record supporting fingers disposed about --.

Signed and sealed this 18th day of February 1969.

(SEAL)
Attest:

Edward M. Fletcher, Jr.
Attesting Officer

EDWARD J. BRENNER
Commissioner of Patents